US005582304A

United States Patent [19]
Dishon, Jr.

[11] Patent Number: 5,582,304
[45] Date of Patent: Dec. 10, 1996

[54] CLOTHESLINE DEVICE FOR CAMPER VEHICLES

[76] Inventor: Norris L. Dishon, Jr., 4068 Madonna Rd., Jarretsville, Md. 21084

[21] Appl. No.: 353,825

[22] Filed: Dec. 12, 1994

[51] Int. Cl.$^6$ ..................................................... A47F 5/00
[52] U.S. Cl. ......................... 211/119.1; 211/86; 248/201; 224/482; 224/546
[58] Field of Search ................................. 211/87, 119.01, 211/119.02, 119.03, 119.1, 119.16, 86, 193; 224/482, 546; 248/201

[56] References Cited

U.S. PATENT DOCUMENTS

| | | | |
|---|---|---|---|
| 2,809,434 | 10/1957 | Cordier | 211/119.1 |
| 2,887,233 | 5/1959 | Bybee | 211/119.1 X |
| 3,675,785 | 7/1972 | Martin | 211/119.1 |
| 4,023,307 | 5/1977 | Clark et al. | 211/119.16 X |
| 4,192,426 | 3/1980 | Gauthier | 211/105.4 |
| 4,592,472 | 6/1986 | Camera | 211/119.01 |
| 5,090,578 | 2/1992 | Arnold | 211/119 |

FOREIGN PATENT DOCUMENTS

| | | | |
|---|---|---|---|
| 568158 | 11/1993 | European Pat. Off. | 211/119.01 |
| 596125 | 7/1959 | Italy | 211/119.02 |

*Primary Examiner*—Robert W. Gibson, Jr.
*Attorney, Agent, or Firm*—Jack Lo

[57] ABSTRACT

A clothesline device includes two spaced apart arms that support several clotheslines therebetween for hanging laundry. Thumb-head bolts removably attach the arms to mounting plates which are permanently attached to the bed platform of a camper vehicle. The clothesline device is attached to the outside of the camper, so that the arms can be mounted far enough apart for supporting long clotheslines, which can be used for hanging a large number of garments. The supporting arms can be easily removed from the bed platform for storage by unscrewing the thumb-head bolts.

7 Claims, 3 Drawing Sheets

5,582,304

CLOTHESLINE DEVICE FOR CAMPER VEHICLES

BACKGROUND OF THE INVENTION

1. Field of the Invention

This invention relates generally to laundry equipment, specifically to a clothesline device for camper vehicles.

2. Prior Art

On extended camping trips of more than a few days, people often find it necessary to launder their clothes. However, many recreational vehicles, or campers, are not provided with any means for laundering or drying clothes. Although the clothes can be washed in the sink or a small plastic basin, drying them is still a problem.

Various proposed clothesline devices are potentially adaptable for use in camper vehicles. U.S. Pat. No. 4,192,426 to Gauthier (1980) shows a rod compressed between opposite walls of a shower stall. Clotheslines are stretched between brackets at opposite ends of the rod. If this device is sized for use in the very small shower in a camper vehicle, it will be so short that it can hang just a few small items of clothing. U.S. Pat. No. 4,592,472 to Camera (1986) shows a chain hung between two mounting strips attached on opposite walls. Although it can be adapted for mounting in a camper, such as in the shower, the chain will have to be so short that it will be of little practical use. U.S. Pat. No. 5,090,578 to Arnold (1992) shows a portable clothesline device with a pair of clamps for clamping onto a window sill. It includes a complicated mechanism for deploying and retracting clotheslines between a pair of arms. If it is sized for mounting on the narrow windows of a camper, the arms will be very close together, so that the clotheslines will be too short to be of much use.

OBJECTS AND ADVANTAGES

Accordingly the primary objects and advantages of the present invention are to provide an improved clothesline device for campers, a clothesline device which can be used for hanging many garments at the same time, which is easily mountable onto the exterior of a camper, which is easily disassembled for storage, and which is very simple in construction. Further objects and advantages will become apparent from a study of the following description of the invention.

SUMMARY OF THE INVENTION

A clothesline device includes a pair of spaced apart arms supporting several clotheslines therebetween. Thumb-head bolts removably attaches each arm to mounting plates, which are permanently attached to the bed platform of a camper.

Drawing Reference Numerals

| | |
|---|---|
| 10. Upper Mounting Plate | 11. Lower Mounting Plate |
| 12. Bolts | 13. Mounting Bar |
| 14. Thumb-Head Bolts | 15. Supporting Arm |
| 16. Bolt | 17A–17C. Holes |
| 18A–18B. Holes | 19. C-Bracket |
| 20. U-Channel | 21. Holes |
| 22. Clothesline Holes | 23. Holes |
| 24. Bed Platform Of Camper | 25. Camper |
| 26. Clotheslines | 27. Angled End |

DESCRIPTION

FIG. 1

Figure 1:
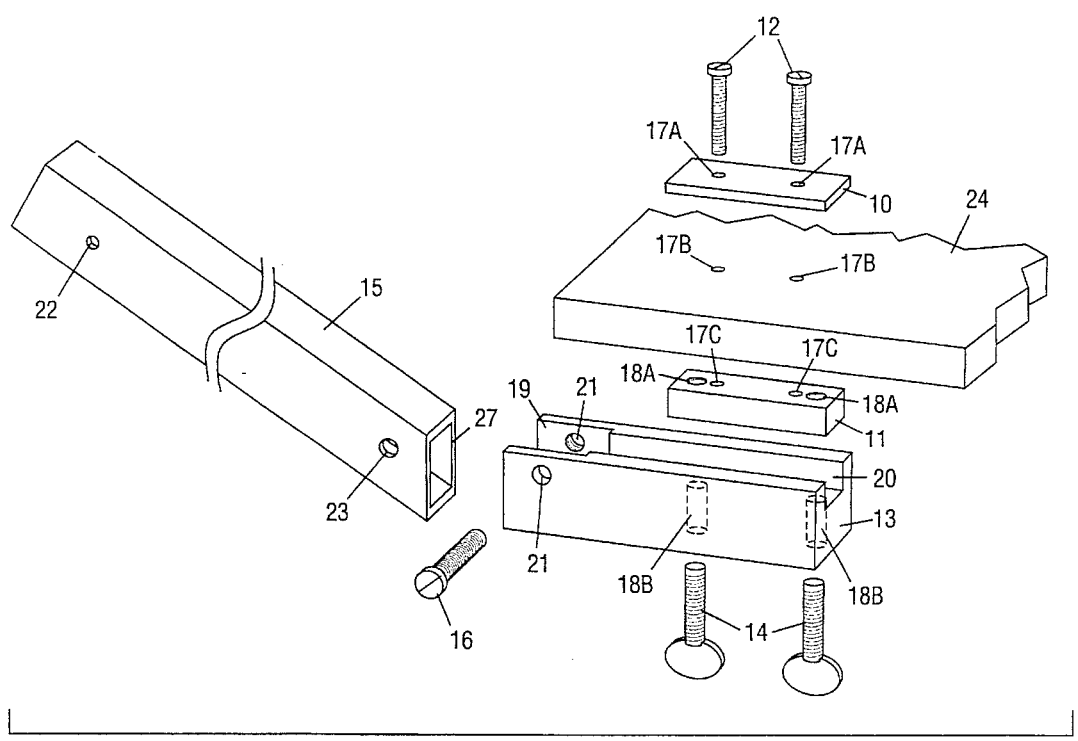
FIG. 1 is an exploded side view of a camper clothesline device in accordance with a preferred embodiment of the invention.

In accordance with a preferred embodiment of the invention shown in the exploded side view in FIG. 1, a clothesline device includes two sets of the following components (one set shown): an upper mounting plate 10, a lower mounting plate 11, a pair of bolts 12, a mounting bar 13, a pair of thumb-head bolts 14, a hollow supporting arm 15, and a bolt 16.

Figure 3:
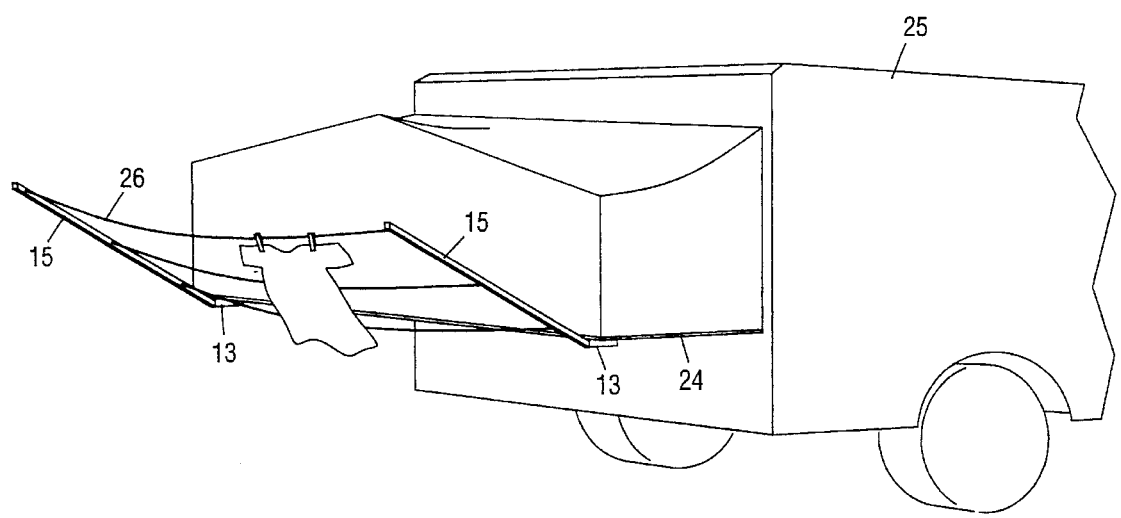
FIG. 3 is a rear perspective view of the clothesline device mounted on a camper.

Upper mounting plate 10 includes a pair of holes 17A for receiving bolts 12. Lower mounting plate 11 includes a pair of holes 17C for receiving bolts 12, and another pair of holes 18A for receiving thumb-head bolts 14. Mounting bar 13 includes a C-bracket 19 formed at its outer end, and a U-channel 20 formed on its top side. C-bracket 19 includes a pair of holes 21 for receiving bolt 16, and U-channel 20 includes a pair of holes 18B for receiving thumb-head bolts 14. Supporting arm 15 includes an angled proximal end 27, three pairs of clothesline holes 22 (one shown) on opposite sides thereof for receiving clotheslines (FIG. 3), and a pair of holes 23 (one shown) for receiving bolt 16. A pair of suitably spaced holes 17B are drilled into the bed platform 24 of a camper (FIG. 3) for receiving bolts 12.

FIG. 2

The clothesline device is installed by permanently fastening upper mounting plate 10 and lower mounting plate 11 above and below, respectively, bed platform 24 with bolts 12. Supporting arm 15 is slidably fitted within C-bracket 19 and secured with bolt 16; angled end 27 causes arm 15 to be supported at an upward angle. Mounting bar 13 is removably attached to lower mounting plate 11 with thumb-head bolts 14. When thus mounted, lower mounting plate 11 is received in U-channel 20.

FIG. 3

Figure 2:
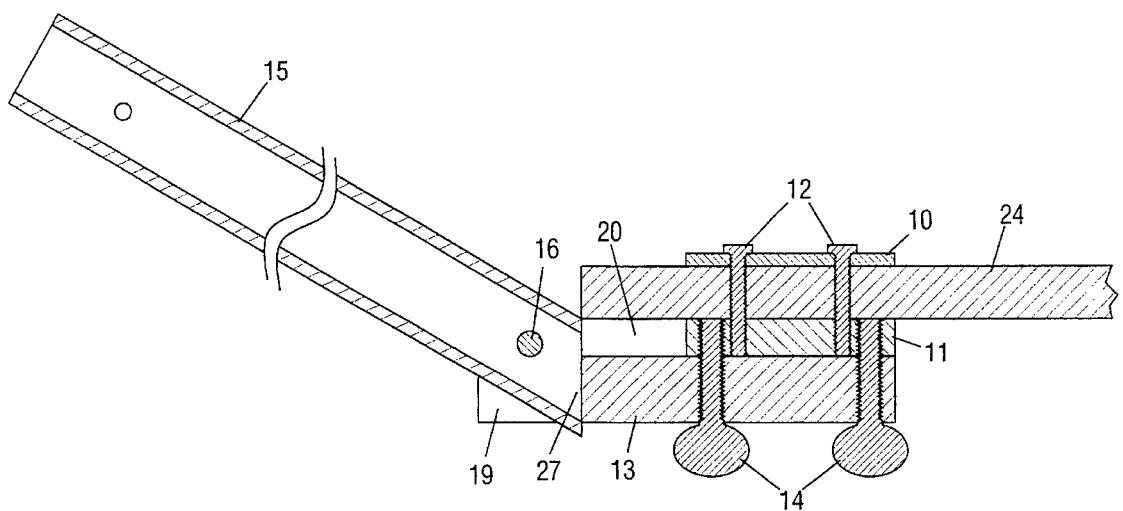
FIG. 2 is a sectional side view of the camper clothesline device.

The clothesline device is shown mounted under retractable bed platform 24 (shown extended) of a camper 25. Two sets of the components shown in FIGS. 1 and 2 are mounted at opposite rear corners of bed platform 24. Three clotheslines 26 are secured in holes 22 (FIG. 1) and supported between arms 15 for conveniently hanging laundry.

Because the clothesline device is mounted on the outside of camper 25, supporting arms 15 can be mounted far enough apart for supporting long clotheslines 26, which can be used for hanging a large number of garments. Supporting arms 15 and mounting bars 13 can be easily detached from bed platform 24 by unscrewing thumb-head bolts 14 (FIG. 2), so that bed platform 24 may be retracted into camper 25.

CONCLUSION, RAMIFICATIONS, AND SCOPE

Accordingly the reader will see that I have provided an improved clothesline device. It can be easily installed onto an extended bed platform of a camper. It supports clotheslines long enough for hanging many garments at the same time. It can be easily removed for storage. It is also very simple in construction.

Although the above descriptions are specific, they should not be considered as limitations on the scope of the invention, but only as examples of the preferred embodiment. Many other ramifications and variations are possible within the teachings of the invention. For example, the C-brackets on the mounting bars can be replaced with tubular sleeves for slidably receiving the arms. The proximal end of each arm may be bent to form an integral mounting bar, so that the separate mounting bar can be eliminated. The U-channel may be eliminated, so that the top surface of the mounting bar is flat. The mounting plates can be attached to a vertical wall of the camper, and the angle of the supporting arm suitably modified to fit thereon. More or fewer clotheslines can be attached. The clothesline device can be attached to other surfaces or objects in addition to camper vehicles. Therefore, the scope of the invention should not be determined by the examples given, but by the appended claims and their legal equivalents.

I claim:

1. A clothesline device for mounting on a surface, comprising:

a pair of spaced apart elongated arms each having a proximal end and a free distal end, a clothesline extending between said arms, a pair of spaced apart mounting plates adapted to be fixedly attached to said surface, and a plurality of bolts for removably attaching said proximal end of each of said arms to a respective mounting plate.

2. A clothesline device for mounting on a surface, comprising:

a pair of spaced apart elongated arms each having a proximal end and a free distal end;

a clothesline extending between said arms;

a pair of spaced apart mounting plates adapted to be fixedly attached to said surface; and a plurality of bolts for removably attaching said proximal end of each of said arms to a respective mounting plate, each of said bolts including a flat head portion for being turned without tools.

3. A clothesline device for mounting on a horizontal surface, comprising:

a pair of spaced apart elongated arms each having a proximal end and a free distal end;

a clothesline extending between said arms;

a pair of spaced apart mounting plates adapted to be fixedly attached to said horizontal surface; and attaching means for removably attaching said proximal end of each of said arms to a respective mounting plate.

4. A clothesline device for mounting on a surface, comprising:

a pair of spaced apart elongated arms each having a proximal end and a free distal end;

a clothesline extending between said arms;

a pair of spaced apart mounting bars adapted to be fixedly attached to said surface, each of said mounting bars having a C-shaped bracket for removably receiving said proximal end of a respective arm; and a bolt securing said proximal end of each of said arms in a respective C-shaped bracket.

5. A clothesline device for mounting under a horizontal board, comprising:

a pair of spaced apart elongated arms each having a proximal end and a free distal end, a clothesline extending between said arms, two pairs of upper and lower mounting plates, each of said pair of upper and lower mounting plates adapted to sandwich said board therebetween, a plurality of bolts each extending through a respective pair of upper and lower mounting plates for securing said upper and lower mounting plates to said board, a pair of mounting bars each having a C-shaped bracket for receiving said proximal end of a respective arm, and a U-shaped channel for receiving a respective lower mounting plate, and attaching means for removably attaching each of said mounting bars to a respective lower mounting plate.

6. The clothesline device of claim 5 wherein said attaching means comprises a plurality of additional bolts.

7. The clothesline device of claim 6 wherein said additional bolts each includes a flat head portion for being turned without tools.

* * * * *